(12) United States Patent
Muraji (10) Patent No.: US 6,874,750 B2
(45) Date of Patent: Apr. 5, 2005

(54) ELECTROMAGNETIC ACTUATOR AND VALVE DRIVER AND POSITION OR SPEED SENSOR COMPRISING IT

(75) Inventor: Tetsuo Muraji, Odawara (JP)

(73) Assignee: Mikuni Corporation, Tokyo (JP)

( * ) Notice: Subject to any disclaimer, the term of this patent is extended or adjusted under 35 U.S.C. 154(b) by 81 days.

(21) Appl. No.: 10/297,482

(22) PCT Filed: Jun. 6, 2001

(86) PCT No.: PCT/JP01/04766

§ 371 (c)(1),
(2), (4) Date: Dec. 6, 2002

(87) PCT Pub. No.: WO01/95348

PCT Pub. Date: Dec. 13, 2001

(65) Prior Publication Data

US 2003/0183792 A1 Oct. 2, 2003

(30) Foreign Application Priority Data

Jun. 6, 2000 (JP) .................................... 2000-169279

(51) Int. Cl.⁷ ............................................. F16K 31/02
(52) U.S. Cl. ..................... 251/129.04; 251/65; 137/554
(58) Field of Search ............................. 251/65, 129.04, 251/129.15; 123/90.11; 137/554; 335/236, 266, 268; 310/27; 324/145, 207.2

(56) References Cited

U.S. PATENT DOCUMENTS

| | | | | |
|---|---|---|---|---|
| 3,789,876 A | * | 2/1974 | Kempton et al. ....... | 251/129.15 |
| 4,166,261 A | * | 8/1979 | Meinke et al. .............. | 335/246 |
| 5,076,221 A | * | 12/1991 | Kawamura ................ | 123/90.11 |
| 5,124,598 A | * | 6/1992 | Kawamura ................ | 123/90.11 |
| 5,280,260 A | * | 1/1994 | Juds et al. ................... | 335/266 |
| 5,359,309 A | * | 10/1994 | Juds et al. ................... | 335/256 |
| 5,406,241 A | * | 4/1995 | Kawamura ............. | 251/129.09 |
| 5,465,757 A | * | 11/1995 | Peters .................... | 251/129.04 |
| 6,060,880 A | * | 5/2000 | Guyot et al. ........... | 324/207.26 |
| 6,612,322 B2 | * | 9/2003 | Becker ........................ | 137/554 |
| 2001/0027087 A1 | | 10/2001 | Shiomi et al. | |

FOREIGN PATENT DOCUMENTS

| | | |
|---|---|---|
| EP | 1045116 A1 | 10/2000 |
| JP | 53-47963 | 4/1978 |
| JP | 62-135297 | 6/1987 |
| JP | 7-224624 | 8/1995 |
| JP | 2000-130345 | 5/2000 |

OTHER PUBLICATIONS

Patent Abstracts of Japan, vol. 011, No. 359 (E–559), Nov. 21, 1987 & JP 62 135297 A (Shinko Electric Co Ltd), Jun. 18, 1987.

Patent Abstracts of Japan, vol. 1995, No. 11, Dec. 26, 1995 & JP 07 224624 A (Toyota Motor Corp), Aug. 22, 1995.

* cited by examiner

Primary Examiner—Eric Keasel
(74) Attorney, Agent, or Firm—Wenderoth, Lind & Ponack, L.L.P.

(57) ABSTRACT

An electromagnetic actuator that detects the position or speed of a drive unit, a valve drive unit and a position or speed sensor that employs the electromagnetic actuator are provided. In the electromagnetic actuator, a magnetic flux generator generates and distributes the magnetic flux. When the magnetic flux changes because of movement of a movable unit, a magnetic path is formed in a magnetic path component that is provided along the direction of movement of the movable unit. The magnetic path passes through a magnetic component. The magnetic flux distributed to the magnetic component is then detected.

15 Claims, 10 Drawing Sheets

ELECTROMAGNETIC ACTUATOR AND VALVE DRIVER AND POSITION OR SPEED SENSOR COMPRISING IT

TECHNICAL FIELD

The present invention relates to an electromagnetic actuator that drives a drive unit with an electromagnetic force, a valve drive unit and a position or speed sensor employing the electromagnetic actuator.

BACKGROUND ART

An electromagnetic actuator that drives the drive unit of a valve is described in Japanese Patent Laid-Open Publication No. 7-224624. The drive unit is driven using an electromagnetic force. The electromagnetic actuator detects a change in the position of the drive unit based on the change in self inductance of an electromagnetic coil.

In the conventional electromagnetic actuator, an oscillating circuit is used to detect the self impedance. This oscillating circuit changes the frequency of oscillation based on the change in the self impedance. As a result, there is a drawback in that it takes a lot of time for the detection of the self impedance depending upon the frequency of oscillation of the oscillating circuit. Also, in the conventional electromagnetic actuator, apart from the oscillating circuit, a rectifying circuit is also required. Thus, there are disadvantages with the conventional electromagnetic actuator in that it has a complex configuration and high cost.

It is an object of the present invention to provide an electromagnetic actuator, a valve drive unit, and a position or speed sensor that detects the speed and the change in position of the drive unit accurately and with simple configuration. It is also an object of the present invention to provide a valve drive unit and a position or speed sensor employing the electromagnetic actuator.

DISCLOSURE OF THE INVENTION

The electromagnetic actuator according to the present invention drives a movable unit using a change in a magnetic field. This electromagnetic actuator consists of a first magnetic path component having a flux generating unit that generates a magnetic flux by means of an electromagnetic coil and a magnetic field forming unit that forms a magnetic field by distribution of the magnetic flux. A movable unit is made of magnetic material and placed in the magnetic field. A second magnetic path component arranged along the direction of movement of the movable unit distributes the magnetic flux. A magnetic path forming unit, in which the magnetic flux is distributed, forms a magnetic path which persists in the second magnetic path component and passes through the movable unit. A magnetic flux detecting unit provided in the second magnetic path component detects the magnetic flux distributed in the second magnetic path component.

In other words, the electromagnetic actuator has a simple configuration and can detect a change in position and speed of the movable unit accurately.

The valve drive unit according to the present invention controls, using a change in magnetic field, opening and closing of a valve in an internal combustion engine for controlling inflow and outflow of vapors. The valve drive unit consists of a first magnetic path component having a flux generating unit that generates a magnetic flux by means of an electromagnetic coil and a magnetic field forming unit that forms a magnetic field by distribution of the magnetic flux. A movable unit is made of magnetic material and placed in the magnetic field, wherein the movable unit is coupled with the valve. A second magnetic path component is arranged along the direction of movement of the movable unit and distributes the magnetic flux. A magnetic path forming unit, in which the magnetic flux is distributed, forms a magnetic path which persists in the second magnetic path component and passes through the movable unit. A magnetic flux detecting unit provided in the second magnetic path component detects the magnetic flux distributed in the second magnetic path component.

In other words, the valve drive unit has a simple configuration and can detect the change in position and the speed of the movable unit accurately.

The position or speed sensor according to the present invention detects the position or speed of an object to be driven, the object being made of a magnetic material. This position or speed sensor consists of a magnetic path component arranged along the direction of the movement of the object, the magnetic path component having a protrusion. A magnetic flux generating unit is provided near the magnetic path component, the magnetic flux generating unit having a protrusion that extend towards the protrusion on the magnetic path component. The magnetic flux generating unit generates a magnetic path that passes through the protrusion on the magnetic path component and the protrusion on the magnetic flux generating unit and persists in the magnetic path component. A magnetic flux detecting unit is provided in the magnetic path component and detects the magnetic flux distributed in the magnetic path component.

In other words, the position or speed sensor has a simple configuration and can detect the change in position and the speed of the movable unit accurately.

BEST MODE FOR CARRYING OUT THE INVENTION

Figure 1:
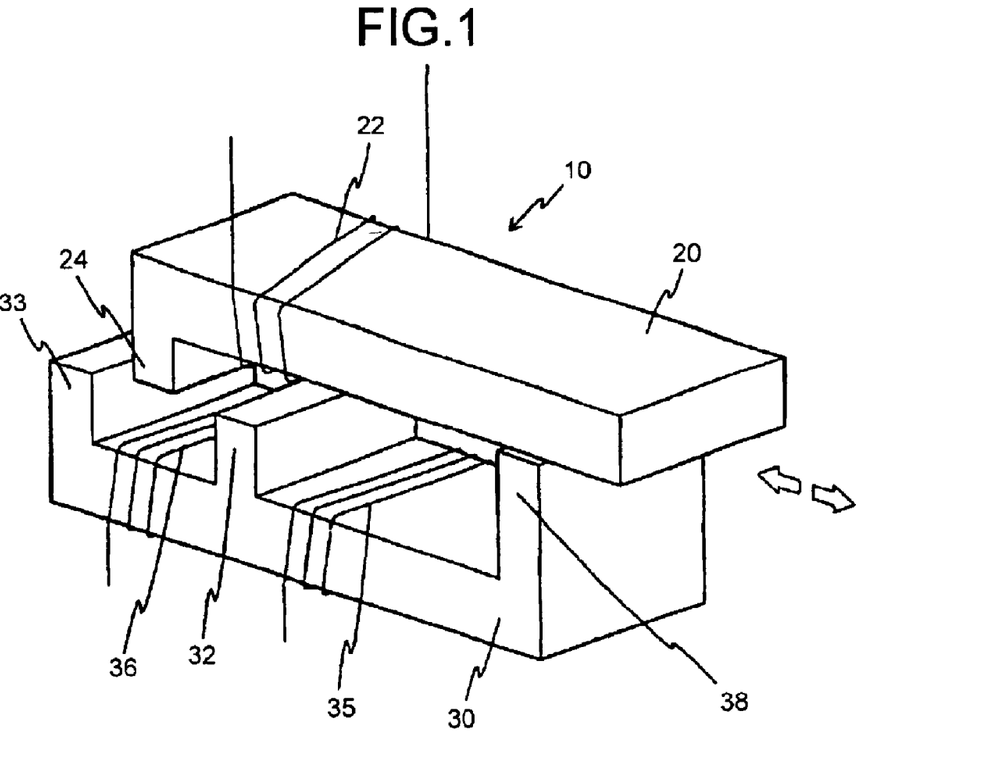
FIG. 1 is a perspective view of a position or speed sensor according to a first embodiment of the present invention.

The first embodiment of the present invention of a position or speed sensor is explained in FIG. 1. A drive unit of a speed sensor 10 has a movable unit 20 that is long in one direction (longitudinal direction). The movable unit 20 is connected to a drive unit that is not shown in the diagram. The drive unit drives the movable unit 20 to and fro in the longitudinal direction, as indicated by the arrows in FIG. 1. The movable unit 20 is made of a magnetic material. An electromagnetic coil 22 is wrapped around the movable unit 20. A current supply unit that is not shown in the diagram is connected to the electromagnetic coil 22. A magnetic flux is generated in the the movable unit 20 in the longitudinal direction when the current is supplied to the electromagnetic coil 22. A protrusion 24 that protrudes downwards is formed in one of the two ends of the movable unit 20.

A stator 30, which is a magnetic path component, is provided near and below the movable unit 20. The stator 30 is supported by a support that is not shown in the diagram. The stator 30 is made of a magnetic material. The stator 30 is long in one direction (longitudinal direction) and this direction is the same the direction of the movement of the movable unit 20. The stator 30 is provided with two protrusions 32 and 33. The protrusions 32 and 33 project towards the protrusion 24 of the movable unit 20. A projection 38 is provided at one end of the two ends of the stator 30. The projection 38 is located near the movable unit 20. An electromagnetic coil 35 is wound around the stator 30 between the projection 38 and the protrusion 32. An electromagnetic coil 36 is wound around the stator 30 between the protrusions 32 and 33. The electromagnetic coils 35 and 36 are connected to a position or speed detecting circuit that is not shown in the diagram. The position or speed sensor detects the position or speed of the movable unit 20.

Figure 2:
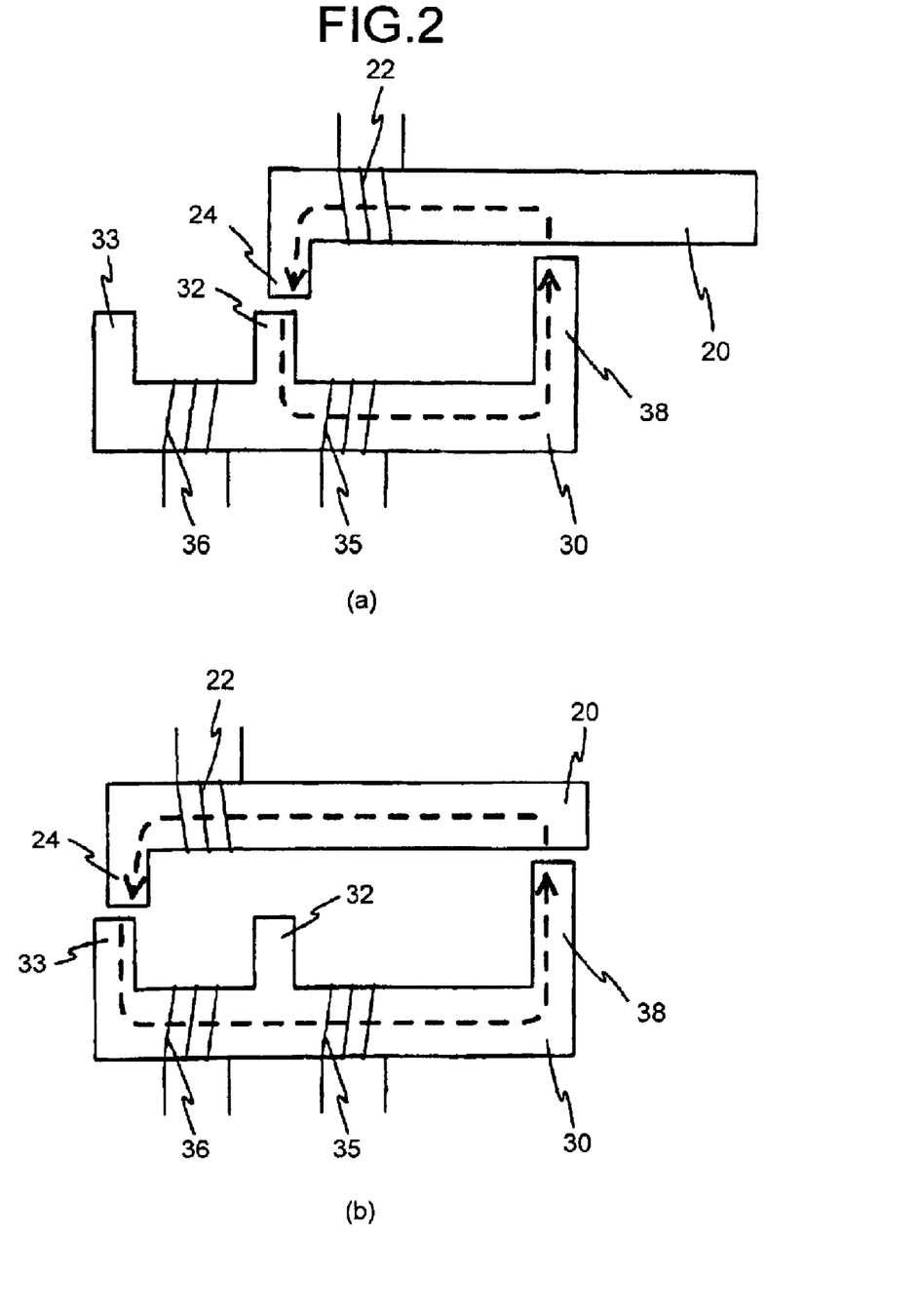
FIG. 2 is an outline view of a movable unit and a stator of the position or speed sensor shown in FIG. 1 and particularly shows the magnetic path that is formed in the movable unit and the stator.

As shown in FIG. 2, a magnetic path is generated between the movable unit 20 and the stator 30 when the current is supplied to the electromagnetic coil 22 from the current supply unit. The magnetic path is indicated by a dotted line. In FIG. 2, same reference numerals have been used for structural elements that have the same structure or the same function as those shown in FIG. 1.

When the current is supplied to the electromagnetic coil 22, a magnetic flux is generated in the movable unit 20 and the stator 30 along the longitudinal direction. When the protrusion 24 is near the protrusion 32 as shown in FIG. 2(a), a magnetic path that starts from the electromagnetic coil 22 and returns to the electromagnetic coil 22, passing through, in order, the protrusion 24, the protrusion 32, the stator 30, the projection 38, and the movable unit 20, is generated. Thus, a persisting magnetic path is generated within the stator 30 along the longitudinal direction. When the direction of the current applied to the electromagnetic coil from the current supply unit is reversed, a magnetic path that is reverse to the magnetic path that is generated when the direction of the current is normal is generated. Considering the case when a magnetic path is generated between the movable unit 20 and the stator 30, the electromagnetic coil 35 detects the rate of change in time of the magnetic flux when the magnetic flux passing through the electromagnetic coil 35 changes. The difference in potential occurring between the two ends of the electromagnetic coil 35 corresponds to the rate of change in time of the detected magnetic flux. The rate of change in time occurs because of the movement of the movable unit 20. Therefore, the value of the difference in potential existing between the two ends of the electromagnetic coil 35 is equivalent to the speed of the movable section. When the protrusion 24 is near the protrusion 32, the potential difference between the ends of the electromagnetic coil 36 is zero because no magnetic flux passes through the electromagnetic coil 36.

When the protrusion 24 is near the protrusion 33, as shown in FIG. 2(b), the magnetic flux generated by the electromagnetic coil 22 is also distributed within the movable unit 20 and the stator 33. In this case, a magnetic path that starts from the electromagnetic coil 22 and returns to the electromagnetic coil 22, passing through, in order, the protrusion 24, the protrusion 33, the stator 30, the projection 38, and the movable unit 20, is generated. Thus, a persisting magnetic path is generated within the stator 30 along the longitudinal direction. When the direction of the current applied to the electromagnetic coil from the current supply unit is reversed, a magnetic path that is reverse to the magnetic path that is generated when the direction of the current is normal is generated. The electromagnetic coils 35 and 36 detect the rate of change in time of the magnetic flux. The difference in potential occurring between the two ends of the electromagnetic coils 35 and 36 is equivalent to the rate of change in time of the detected magnetic flux.

When the movable unit 20 is driven by the drive unit such that the protrusion 24 is near the protrusion 32, a difference in potential occurs between the two ends of the electromagnetic coil 35. It is hence possible to obtain the speed of the movable unit 20 by detecting the difference in potential occurring between the two ends of the electromagnetic coil 35. Also, when the protrusion 24 moves away from the protrusion 32, the electric potential between the two ends of the electromagnetic coil 35 will become zero. Thus, when the electric potential between the two ends of the electromagnetic coil 35 has become zero, it can be determined that the protrusion 24 has moved away from the protrusion 32. Moreover, when the protrusion 24 moves near to the protrusion 33, a difference of potential occurs between the ends of the electromagnetic coils 35 and 36. Hence it is possible to obtain the speed of the movable unit 20 based on the detection of the difference in potential between the ends of the electromagnetic coil 36.

Figure 3:
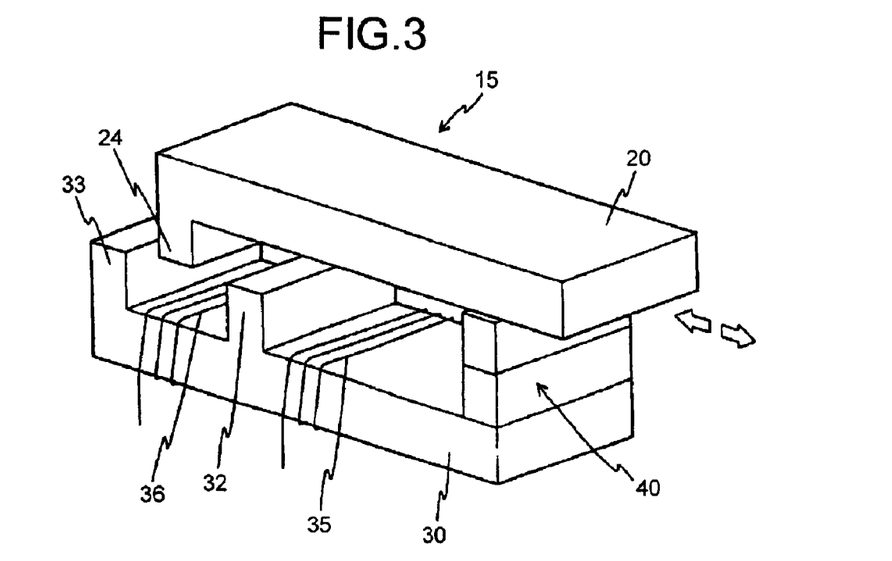
FIG. 3 is a perspective view of the position or speed sensor according to a second embodiment of the present invention.

A position or speed sensor according to the second embodiment of the present invention is shown in FIG. 3. The position or speed sensor also obtains the position and speed of the movable unit based on the detection of the magnetic flux generated in magnetic material. In FIG. 3, the same reference numerals have been used for the structural elements that have same structure or same function as those shown in FIG. 1.

A magnetic component 40 is provided at one end of the stator 30 of a speed sensor 15. The magnetic component 40 consists of, for example, two pieces of permanent magnets with oppositely polarized surfaces stuck together. It is assumed here that the upper portion of the magnetic component 40 is magnetized as the north pole and the lower portion is magnetized as the south pole. The magnetic component 40 is provided at one end of the stator 30 near the movable unit 20. When the protrusion 24 is located near the protrusion 32, a magnetic flux is generated within the movable unit 20 and the stator 30 by the magnetic component 40. Consequently, a circular magnetic path that starts from the magnetic component 40 and returns to the magnetic component 40, passing through in the order of the movable unit 20, the protrusion 24, the protrusion 32, and the stator 30, is generated. Thus, a persisting magnetic path is generated within the stator 30 along the longitudinal direction. When the protrusion 24 is near the protrusion 33, magnetic flux is also distributed inside the movable unit 20 and the stator 30 by the magnetic component 40. Nevertheless, in this case, a circular magnetic path that starts from the magnetic component 40 and returns to the magnetic component 40, passing through in the order of the movable unit 20, the protrusion 24, the protrusion 33, and the stator 30, is generated. Thus, a persisting magnetic path is generated within the stator 30 along the longitudinal direction. When the polarity of the magnetic component 40 is switched, i.e., when the upper portion of the magnetic component 40 is magnetized as the south pole and the lower portion of the magnetic component 40 is magnetized as the north pole, the direction of the magnetic path can be reversed.

When the magnetic component as described is used, it is possible to obtain the speed of the movable unit 20. This can be achieved by detecting the difference in potential that occurs between the ends of the electromagnetic coil 35 when the protrusion 24 moves close to the protrusion 32. When the protrusion 24 moves to a position that is far from the protrusion 32 and the difference in potential between the two ends of the electromagnetic coil 35 becomes zero, it is possible to determine that the protrusion 24 has moved away from the protrusion 32. Moreover, when the protrusion 24 moves near the protrusion 33, it is possible to obtain the speed of the movable unit 20 by detecting the difference in potential between the two ends of the electromagnetic coil 36.

In the first and second embodiments, the magnetic flux generating unit is formed from the electromagnetic coil 22 or the magnetic component 40. Further, the magnetic path component is formed from the stator 30, the drive unit is formed from the movable unit 20, and the magnetic flux detecting unit is formed from the electromagnetic coils 35 and 36.

Figure 4:
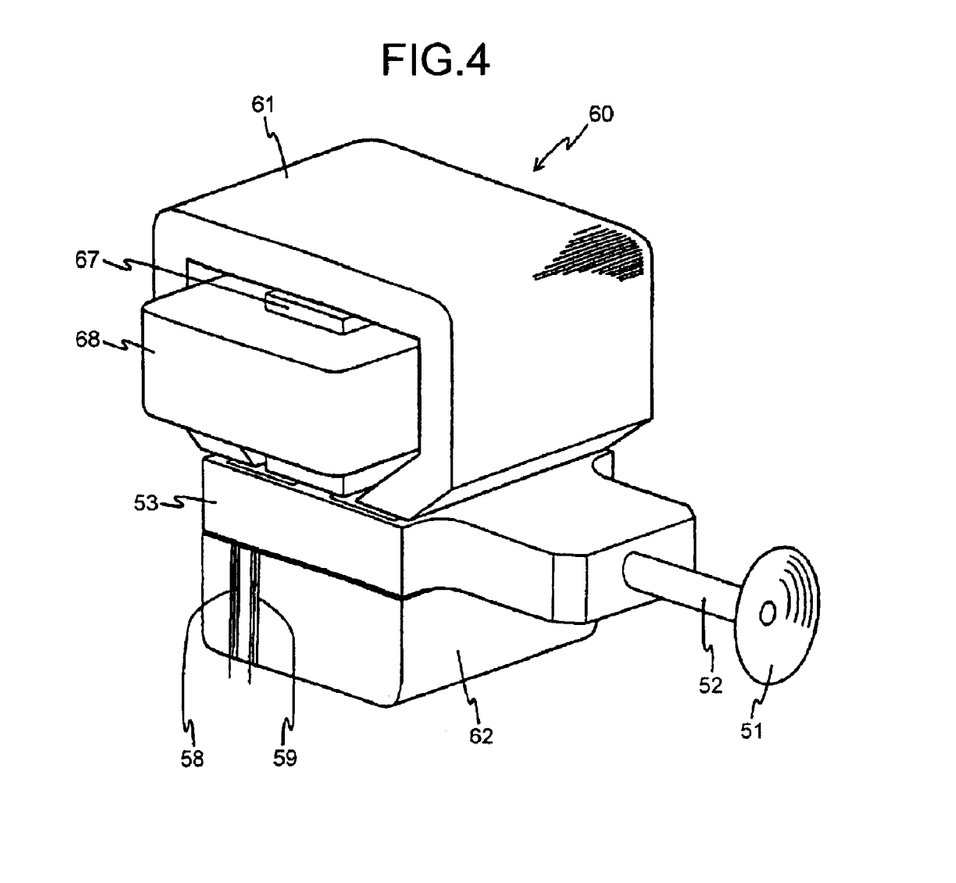
FIG. 4 is a perspective view of the electromagnetic actuator and the valve drive unit according to a third embodiment of the present invention.
Figure 5:
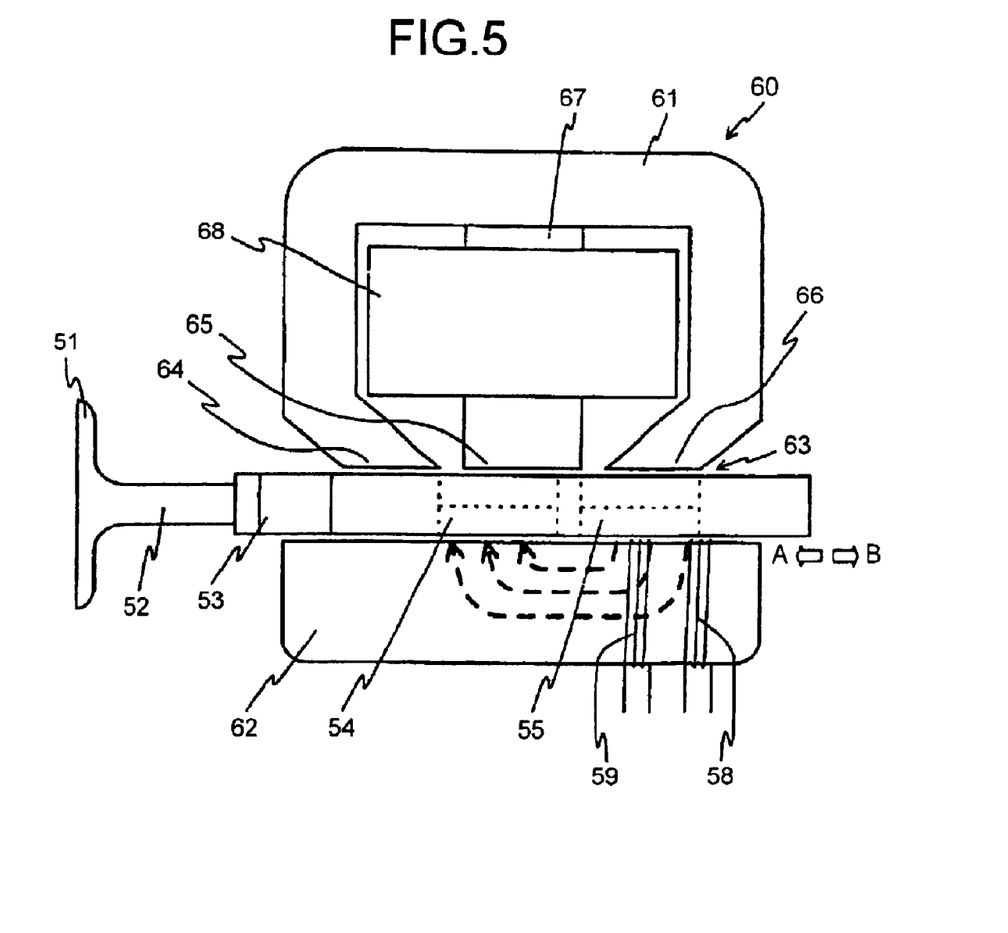
FIG. 5 is a side view of a electromagnetic actuator and a valve drive unit shown in FIG. 4 and particularly shows the magnetic path formed in the electromagnetic actuator and the valve drive unit.

An electromagnetic actuator and a valve drive unit according to a third embodiment of the present invention is shown in FIG. 4 and FIG. 5.

In an actuator 60, a valve disc 51 is fixed to one end of a valve shaft 52. The valve shaft 52 is fixed to a movable unit 53. Two magnetic components 54 and 55 of the same thickness as that of the movable unit 53 are fixed to the movable unit 53. Each of magnetic components 54 and 55 consists of, for example, two pieces of permanent magnets with oppositely polarized surfaces stuck together. The magnetic component 54 and 55 have opposite polarities. Three pole pieces 64, 65, and 66 are arranged along the direction of movement of the movable unit 53 at an end of a yoke 61 of the actuator 60. The magnetic components 54 and 55 are sandwiched between a yoke 62 and the pole pieces 64, 65, and 66, which are also magnetic components, leaving a gap 63. As shown by arrows A and B in FIG. 5, the movable unit 53 can freely move to and fro. Depending on the movement of the movable unit 53, the valve disc 51 accordingly opens and closes. Two different magnetic fields are generated near the pole pieces 64 and 65 and near the pole pieces 65 and 66 within the gap 63. The magnetic components 54 and 55 are provided to correspond to these magnetic fields, respectively. A core 67 is provided in the central portion of the yoke 61. An electromagnetic coil 68 is wound around the core 67. The electromagnetic coil 68 is connected to an electric supply unit that is not shown in the diagram. The electric supply unit supplies a current of specific polarity to the electromagnetic coil 68 depending on whether the valve disc 51 is to be opened or closed.

It is assumed here for the sake of explanation that the portion of the magnetic component 54 that is towards the yoke 61 is magnetized as the north pole and the portion that is towards the yoke 62 is magnetized as the south pole, and the portion of the magnetic component 55 that is towards the yoke 61 is magnetized as the south pole and the portion that is towards the yoke 62 is magnetized as the north pole.

When the current is supplied from the current supply unit to the electromagnetic coil 68, a magnetic flux is generated within the core 67. The magnetic flux is distributed within the yoke 61 and induced on the surfaces of the pole pieces 64, 65, and 66. Accordingly, a magnetic field is generated. The pole pieces 64 and 66 will have the same polarity. But, the polarity of the pole piece 65 will be opposite to that the polarities of the pole pieces 64 and 66. For example, when the current flows in the predetermined direction to the electromagnetic coil 68, the pole pieces 64 and 66 will have the south polarity and the pole piece 65 will have the north polarity. In contrast, when the current flows in a direction opposite to that of the predetermined direction, the pole pieces 64 and 66 will have the north polarity and the pole piece 65 will have the south polarity.

When the pole pieces 64 and 66 have the south polarity and the pole piece 65 has the north polarity, a new magnetic path is generated. This magnetic path originates from the north pole of the magnetic component 54 and ends at the south pole of the magnetic component 54. After starting from the north pole of the magnetic component 54, the magnetic path passes through in the order of the pole piece 64, the yoke 61, the core 67, the pole piece 65, the south pole of the magnetic component 55, the north pole of the magnetic component 55, the yoke 62, and finally returns to the south pole of the magnetic component 54. As a result, the magnetic components 54 and 55 move in the direction of arrow A indicated in FIG. 5, along with the movable unit 53, depending on the magnitude of the magnetic flux density generated inside the core 67. On the other hand, when the pole pieces 64 and 66 have the north polarity and the pole piece 65 has the south polarity, a different magnetic path is generated. This magnetic path originates from the north pole of the magnetic component 54 and ends at the south pole of the magnetic component 54. After starting from the north pole of the magnetic component 54, the magnetic path passes through in the order of the pole piece 65, the core 67, the yoke 61, the pole piece 66, the south pole of the magnetic component 55, the north pole of the magnetic component 55, the yoke 62, and finally returns to the south pole of the magnetic component 54. As a result, the magnetic components 54 and 55 move in the direction of arrow B indicated in FIG. 5, along with the movable unit 53, depending on the magnetic flux density generated inside the core 67.

Thus, by controlling the direction of the current supplied to the electromagnetic coil 68, the movable unit 53 can be moved in the A direction or the B direction as desired, and therefore, the valve disc 51 can be moved to the opening position or the closing position as desired.

Two electromagnetic coils 58 and 59 are wound around the yoke 62 along the direction of the movement of the movable unit 53. Moreover, the yoke 62 is near the magnetic components 54 and 55. As a result, a magnetic flux originating from the north pole of the magnetic component 55 and ending at the south pole of the magnetic component 54 is generated within the yoke 62. As indicated by the dotted thick-line shown in FIG. 5, a magnetic path is generated in the yoke 62 along the direction of the movement of the movable unit 53. When the movable unit 53 moves, the magnetic flux ranging from the north pole of the magnetic component 55 to the south pole of the magnetic component 54 also moves. Accordingly, the magnetic flux passing through the electromagnetic coils 58 and 59 also changes. Since there is a change in the magnetic flux, a difference in potential occurs between the ends of the electromagnetic coils 58 and 59. This difference in potential occurs according to the rate of change of the electric flux when the movable component 53 moves. The magnetic field generated from the north pole of the magnetic component 55 to the south pole of the magnetic component 54 is larger than the magnetic field generated by the electromagnetic coil 68. As a result, the voltage arising in the electromagnetic coils 58 and 59 during the movement of the movable unit 53 is larger than the voltage occurring in the electromagnetic coils 58 and 59 when the magnetic field is generated by the electromagnetic coil 68 that is the excitation coil. Thus, in the electromagnetic actuator and the valve drive unit according to the third embodiment, since a configuration for detecting the change in magnetic flux during the displacement of the magnetic component is adopted, it is possible to lessen the influence of the change in magnetic field of the excitation coil on the voltage generated by the electromagnetic coils 58 and 59.

Figure 6:
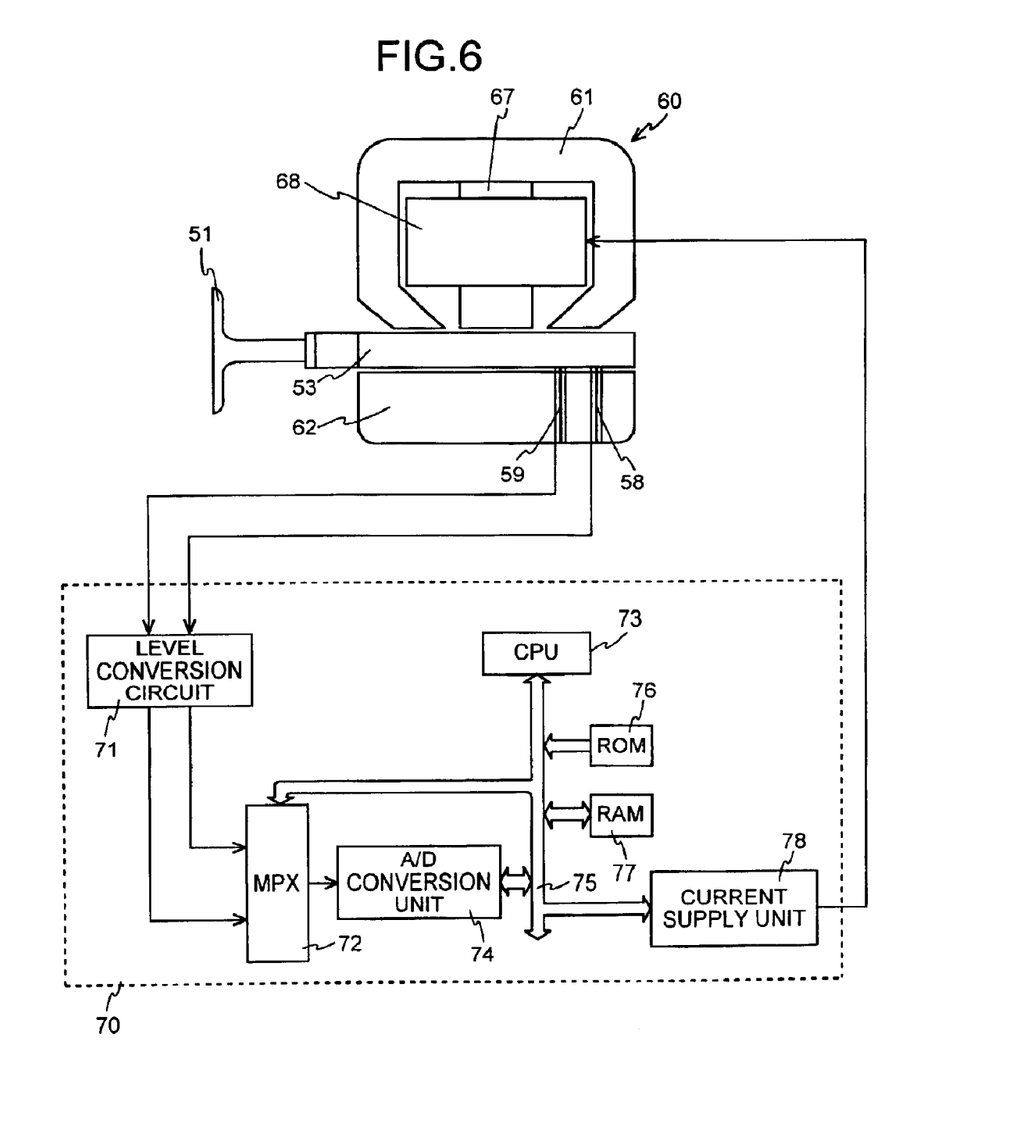
FIG. 6 is a block diagram of a control circuit that controls the electromagnetic actuator and the valve drive unit shown in FIG. 4.
Figure 7:
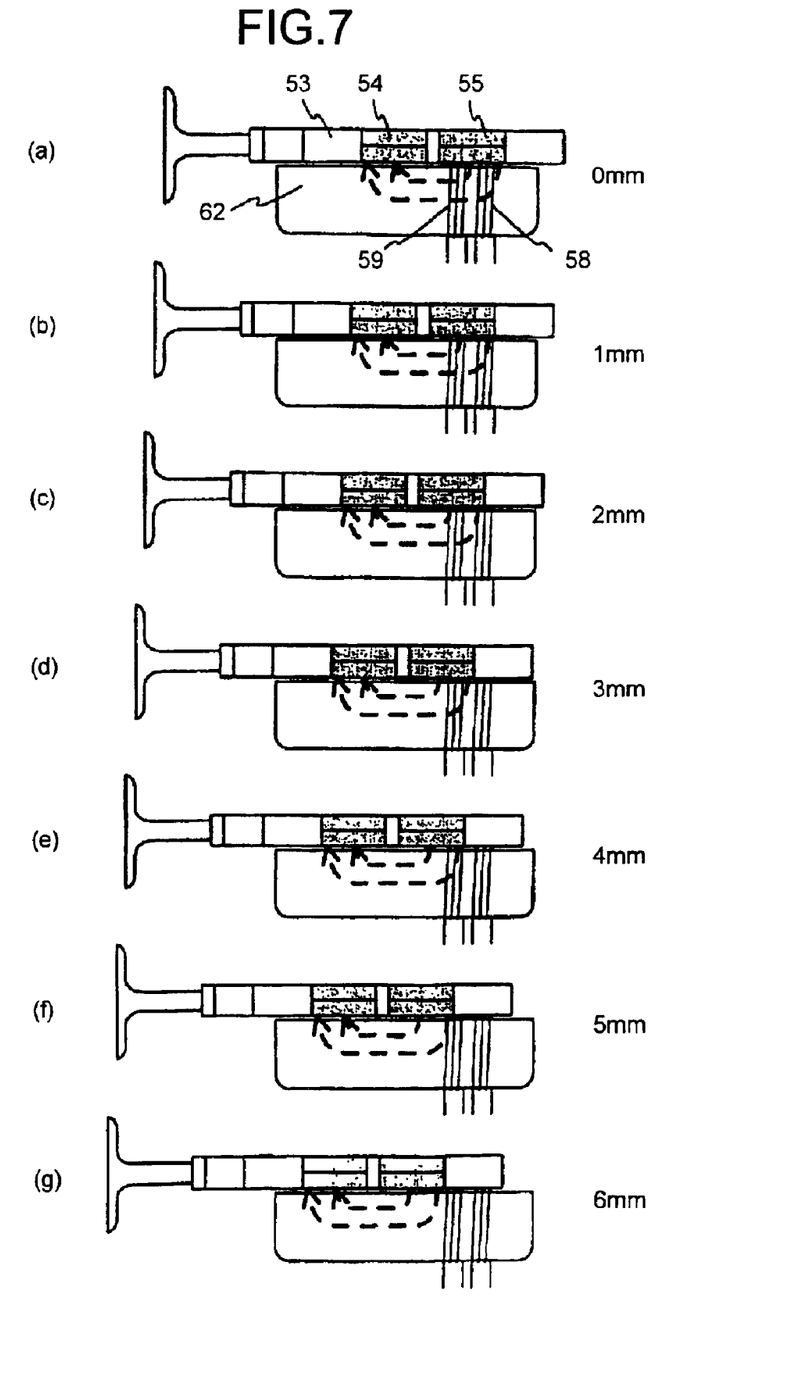
FIG. 7 shows side views that explain the relationship between the displacement of the movable unit and the positional relationship of a magnetic component and an electromagnetic coil.

As shown in FIG. 6, the difference in potential between the terminals of the electromagnetic coils 58 and 59 is supplied to the position or speed detecting circuit as a detection signal. The detection signal is actually fed as a voltage signal. The position or speed detecting circuit may be, for example, an engine control unit. In FIG. 6, the same reference numerals have been used for the structural elements that have same structure or same function as those shown in FIG. 4 or FIG. 5.

The voltage signals from the electromagnetic coils 58 and 59 are supplied to a level conversion circuit 71 in a position or speed detecting circuit 70. The level conversion circuit 71 amplifies the voltage signals to desired voltages. The voltage signals are supplied to a multiplexer 72 (MPX). The MPX 72 is a switch that selects one voltage signal from the two voltage signals output from the level conversion circuit 71 and outputs the selected signal to an analog-to-digital conversion circuit (A/D conversion unit) 74. The MPX performs the selection of the voltage signal based on the command issued at a predetermined timing by a central processing unit (CPU) 73. The A/D conversion unit 74 converts the analog voltage signal to a digital signal and supplies the digital signal to an input-output bus 75. The input-output bus 75 performs transmission of data signals or address signals to and from the CPU 73.

A ROM (read only memory) 76, a RAM (random access memory) 77, and a current supply unit 78 are connected to the input-output bus 75. The ROM 76 stores a program and a map. The program stored in the ROM 76 obtains the speed and the position of the movable unit 53 from the digital signal flowing in the input-output bus 75. The map stored in the ROM 76 determines the current supplied to the electromagnetic coil 68 based on the position and speed of the movable unit 53. The RAM 77 stores a variable and a flag that are used to execute the program stored in the ROM 76. Based on the execution of the program stored in the ROM 76, the CPU 73 searches the map and issues a command, which depends on the result of the search, to the current supply unit 78 via the input-output bus 75. The current supply unit 78 supplies a current to the electromagnetic coil 68 based on the command issued by the CPU 73.

In the third embodiment, a magnetic flux generating unit is formed by the core 67, a magnetic field generating unit is formed by the pole pieces 64, 65, and 66, a first magnetic path component is formed by the yoke 61, and a second magnetic path component is formed by the yoke 62. Moreover, a magnetic path forming unit is formed by the yoke 62 and the magnetic components 54 and 55, a magnetic flux detecting unit is formed by the electromagnetic coils 58 and 59, a drive unit power operation unit or an electric potential difference detecting unit is formed by the position or speed detecting circuit 70, and an electromagnetic actuator or a valve drive unit is formed by the actuator 60.

The actuator 60 may be used to control the intake and exhaust of the gaseous material in an internal combustion engine. In this case, the actuator 60 is placed near the combustion chamber of the internal combustion engine. When the actuator 60 is provided in a recirculation pipe, the flow of the exhaust gas that is exhausted from the internal combustion engine and supplied to the induction pipe is regulated. The recirculation pipe is connected to the exhaust pipe and the induction pipe of the internal combustion engine.

The third embodiment assumes that the actuator 60 is connected to the position or speed detecting circuit 70. However, it is not limited to this configuration. For example, the position or speed sensor 10 according to the first embodiment or the position or speed sensor 15 according to the second embodiment 15 maybe be connected to the position or speed detecting circuit 70.

When the movable unit 53 undergoes displacement as shown in FIGS. 7(a) to 7(g), the magnitude of the magnetic flux passing through the electromagnetic coils 58 and 59, the rate of change of magnetic flux, and the difference in the rate of change of magnetic flux also changes depending on the amount of displacement of the movable unit 53. The changes brought about by the displacement of the movable unit 53 are shown in graphs in FIGS. 8, 9, and 10. In FIG. 7, the same reference numerals have been used for the structural elements that have same structure or same function as those shown in FIG. 4, FIG. 5, and FIG. 6. Moreover, in the same manner as FIG. 5, the magnetic flux extending from the north pole of the magnetic component 55 to the south pole of the magnetic component 54 is indicated by a dotted thick-line.

Figure 8:
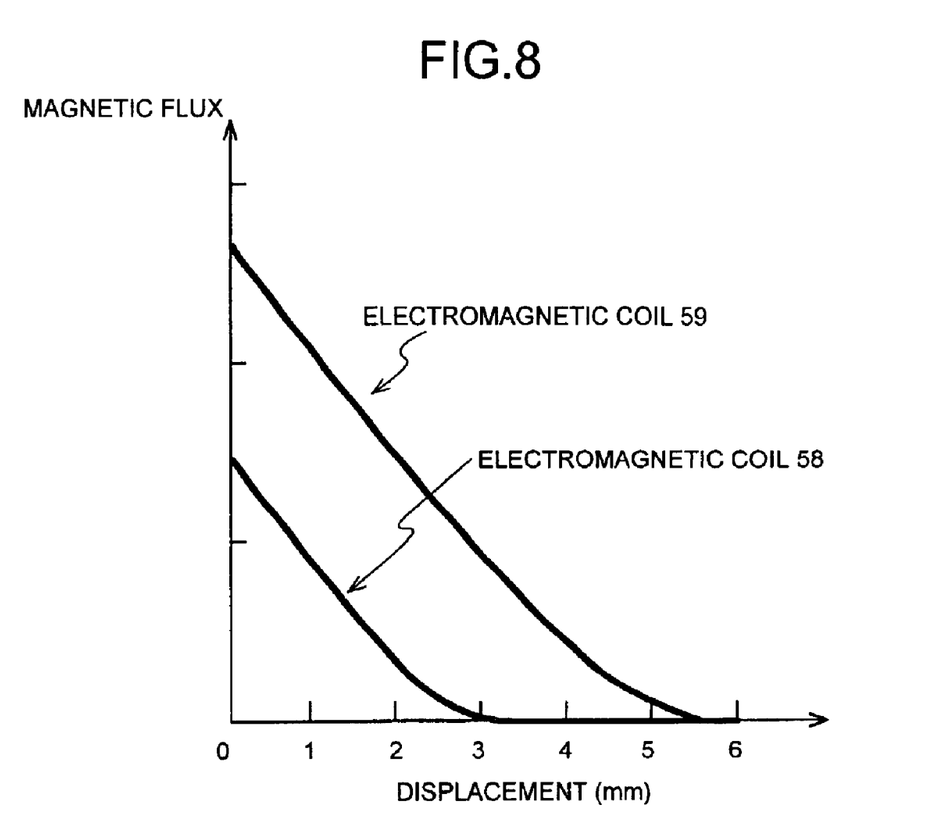
FIG. 8 is a graph that shows the relationship between the displacement of the movable unit and the magnetic flux that passes through the electromagnetic coil.

As shown in FIG. 7(a), when the displacement of the movable unit 53 is 0 mm, the right end of the magnetic component 55 is located more towards the right side than the right end of the magnetic coil 58, and therefore, the magnetic flux that generates from the magnetic component 55 passes through both of the electromagnetic coils 58 and 59. However, in this case, as shown in FIG. 8, the magnetic flux density passing through the electromagnetic coil 59 is more than the magnetic flux density passing through the electromagnetic coil 58. In FIG. 8, the lower curve indicates the magnetic flux intensity passing through the electromagnetic coil 58 and the upper curve indicates the magnetic flux intensity passing through the electromagnetic coil 59. When the displacement of the movable unit 53 is 1 mm, the right end of the magnetic component 55 is located near the right end of the electromagnetic coil 58 (see FIG. 7(b)), and therefore, as shown in FIG. 8, the magnetic flux density passing though the electromagnetic coils 58 and 59 also decreases. When the displacement of the movable unit 53 is 2 mm, the right end of the magnetic component 55 is located in a center position between the right end and the left end of the electromagnetic coil 58 (see FIG. 7(c)), and therefore, the magnetic flux density passing though the electromagnetic coil 58 is close to zero. When the displacement of the movable unit 53 is 3 mm, the right end of the magnetic component 55 is located near the left end of the electromagnetic coil 58 (see FIG. 7(d)), and therefore, the magnetic flux density passing though the electromagnetic coil 58 is zero. When the displacement of the movable unit 53 is 4 mm, the right end of the magnetic component 55 is located near the right end of the electromagnetic coil 59 (see FIG. 7(e)), and therefore, as shown in FIG. 8, the magnetic flux density passing though the electromagnetic coil 59 decreases further. When the displacement of the movable unit 53 is 5 mm, the right end of the magnetic component 55 is located in a center position between the right end and the left end of the electromagnetic coil 59 (see FIG. 7(f)), and therefore, the magnetic flux density passing though the electromagnetic coil 59 is close to zero. When the displacement of the movable unit 53 is 6 mm, the right end of the magnetic component 55 is located near the left end of the electromagnetic coil 59 (see FIG. 7(g)), and therefore, the magnetic flux density passing though the electromagnetic coil 59 is zero.

Figure 9:
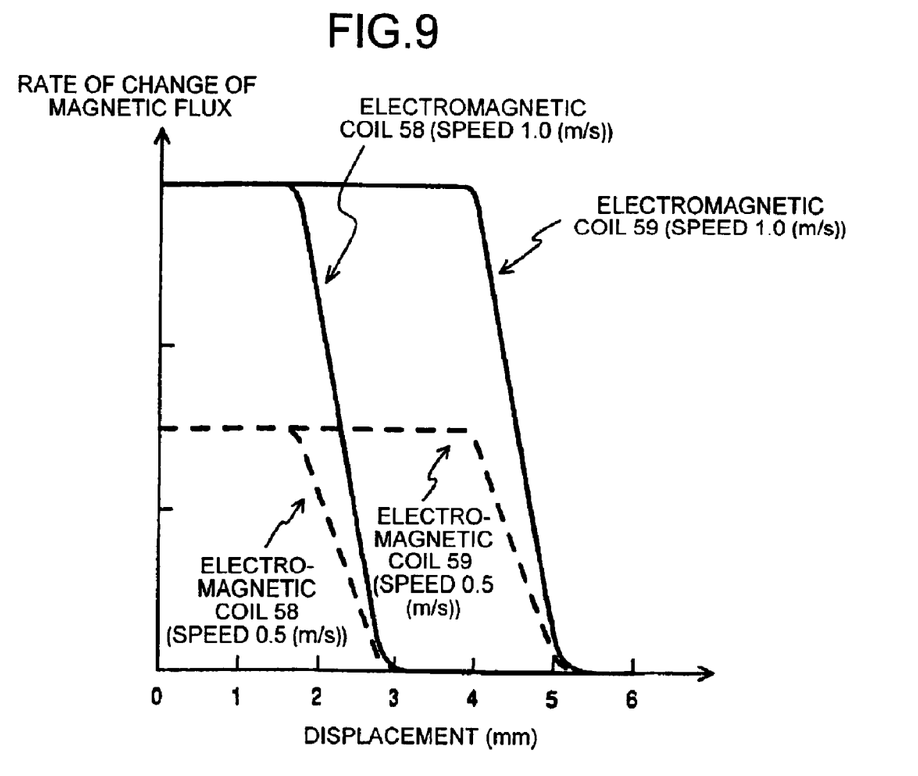
FIG. 9 is a graph that shows the relationship between the displacement of the movable unit and the rate of change of the magnetic flux.

When the magnetic components 54 and 55 of the movable unit 53 pass near the electromagnetic coils 58 and 59, the magnetic flux extending from the north pole of the magnetic component 55 to the south pole of the magnetic component 54 also moves along with the movement of the movable unit 53. Hence, the magnetic flux that passes through the electromagnetic coils 58 and 59 also changes. Accordingly, a difference in potential corresponding to the rate of change of magnetic flux occurs between the ends of the electromagnetic coils 58 and 59. FIG. 9 shows the rate of change of magnetic flux detected by the electromagnetic coils 58 and 59 when it is assumed that the movable unit 53 moves at constant speeds of 1.0 m/s and 0.5 m/s. In FIG. 9, the rate of change of magnetic flux when the speed is 1.0 m/s is indicated by a solid line, and when the speed is 0.5 m/s is indicated by a dotted line. Out of the solid and dotted lines, the lines on the right indicate the rate of change of magnetic flux detected by the electromagnetic coil 59, and the lines on the left indicate the rate of change of magnetic flux detected by the electromagnetic coil 58.

When the displacement of the movable unit 53 is between 0 to 4 mm, the rate of change of magnetic flux detected by the electromagnetic coil 59 is constant irrespective of whether the speed of the movable unit 53 is 1.0 m/s or 0.5 m/s. When the displacement of the movable unit 53 is more than 4 mm, the rate of change of magnetic flux detected by the electromagnetic coil 59 decreases gradually and becomes zero when the displacement of the movable unit 53 is close to 6 mm.

When the displacement of the movable unit 53 is 0 to 2 mm, the rate of change of magnetic flux detected by the electromagnetic coil 58 is constant irrespective of whether the speed of the movable unit 53 is 1.0 m/s or 0.5 m/s. When the displacement of the movable unit 53 is more than 2 mm, the rate of change of magnetic flux detected by the electromagnetic coil 58 decreases gradually and becomes zero when the displacement of the movable unit 53 is more than 3 mm.

When the magnetic components 54 and 55 pass near the electromagnetic coils 58 and 59, a difference in potential corresponding to the rate of change of magnetic flux occurs between the ends of the electromagnetic coils 58 and 59, as shown in FIG. 9. Hence, it is possible to determine whether the ends of the magnetic components pass through the position of the electromagnetic coil, depending on whether the difference in potential between the ends of the electromagnetic coils 58 and 59 has become zero. When the difference in potential between the ends of the electromagnetic coil 58 is determined as 0, it is possible to determine that the movable unit 53 has moved 3 mm (see FIG. 7(d)). Similarly, it is possible to determine that the movable unit 53 has moved 6 mm when the difference in potential between the ends of the electromagnetic coil 59 is determined as 0.

As shown in FIG. 9, the rate of change of magnetic flux when the speed of the movable unit 53 is 1.0 m/s is twice the rate of change of magnetic flux when the speed is 0.5 m/s. Hence, after obtaining the amount of displacement of the movable unit 53 based on the magnetic flux generated by the electromagnetic coils 58 and 59, it is also possible to obtain the speed of the movable unit 53 by detecting the potential difference between the ends of the electromagnetic coils 58 and 59. For example, when the difference in potential between the ends of the electromagnetic coil 58 is 0, it is possible to determine that the displacement of the movable unit 53 is 3 mm. In the same manner, it is possible to obtain the speed of the movable unit 53, by detecting the difference in potential between the ends of the electromagnetic coil 59, when the displacement of the movable unit 53 is 3 mm.

Figure 10:
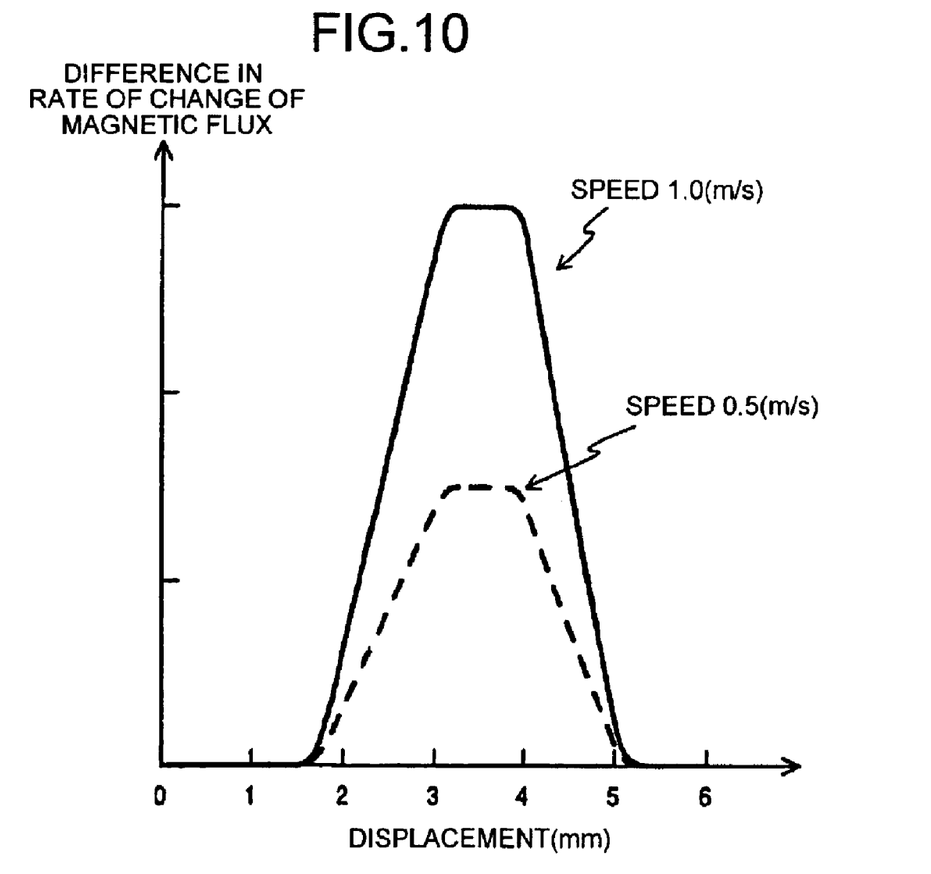
FIG. 10 is a graph that shows the relation between the displacement of the movable unit and the difference in the rate of change of magnetic flux.

As shown in FIG. 10, the difference in the rate of change of magnetic flux detected by the electromagnetic coil 58 and that which is detected by the electromagnetic coil 59 also undergoes changes depending on the displacement of the movable unit 53. In FIG. 10, the difference in the rate of change of magnetic flux when the movable unit 53 moves at a speed of 1.0 m/s is indicated by a solid line and the difference in the rate of change of magnetic flux when the movable unit 53 moves at a speed of 0.5 m/s is indicated by a dotted line.

When the displacement of the movable unit 53 is between 0 mm to 1.5 mm, the difference in the rate of change of magnetic flux is close to zero. The difference in the rate of change of magnetic flux gradually increases as the displacement of the movable unit 53 becomes more than 1.5 mm, becomes maximum when the displacement becomes 3.5 mm, and decreases gradually as the displacement becomes more than 4 mm. The displacement of the movable unit 53 becomes zero when the displacement of the movable unit 53 exceeds 5 mm. It is also clear from FIG. 10 that the difference in the rate of change of magnetic flux increases with the speed of the movable unit 53. The rate of change of magnetic flux when the speed of the movable unit 53 is 1.0 m/s is twice the rate of change of magnetic flux when the speed is 0.5 m/s. Thus, it is possible to obtain the speed of the movable unit 53 from the rate of change of magnetic flux. When noise is superimposed on the voltage signals generated from the magnetic coils 58 and 59, it is possible to negate the noise and accurately detect the rate of change of magnetic flux because a configuration for obtaining a difference in the rate of change of the magnetic flux is employed. For example, the noise superimposed on the voltage signals may be noise generated by chopping, which is used for current control. In the third embodiment, in the position or speed detection circuit 70, it is possible to obtain the rate of change of magnetic flux from the voltage signals that are generated by the electromagnetic coils 58 and 59.

Figure 11:
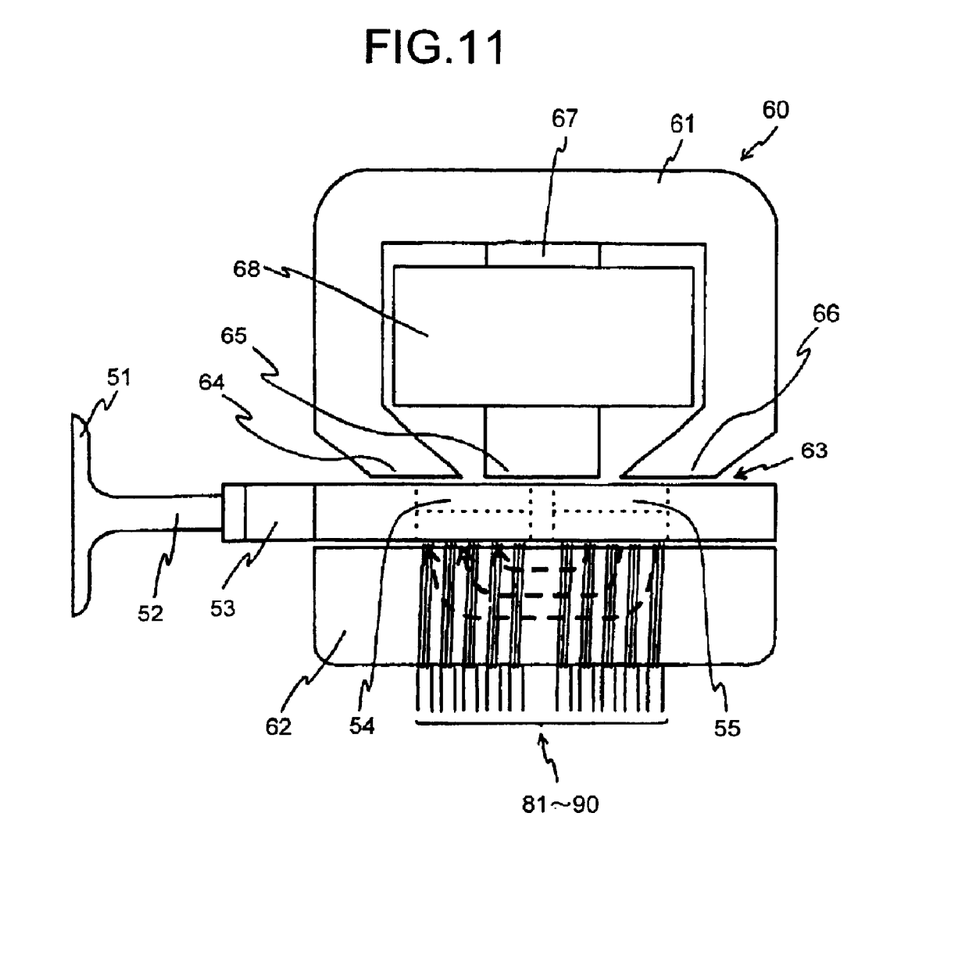
FIG. 11 is a side view that shows the electromagnetic actuator and the valve drive unit according to a fourth embodiment of the present invention.

The above mentioned embodiments assume a case in which two electromagnetic coils are provided to detect the rate of change of magnetic flux. However, it is not limited to this configuration. For example, as shown in FIG. 11, more than three electromagnetic coils, for example even ten electromagnetic coils 81 to 90, may be wound around the yoke 62. The rate of change of magnetic flux can be detected by means of the ten electromagnetic coils that are arranged along the direction of the movement of the movable unit 53. Hence, it is possible to determine the position of the movable unit 53 depending on whether the movable unit 53 has passed through the positions of the respective electromagnetic coils. Accordingly, it is also possible to determine the speed of the movable unit 53 precisely at the position of the respective electromagnetic coil.

The above mentioned embodiments assume a case in which electromagnetic coils are provided to detect the magnetic flux. However, it is not limited to this configuration. For example, the magnetic flux detecting elements such as the hole elements maybe used to detect the magnetic flux.

The electromagnetic actuator and the valve drive unit and the position or speed sensor employing the electromagnetic actuator according to the present invention have simple configurations and they detect the position or speed of the movable unit accurately.

What is claimed is:

1. A valve driving unit that controls, using a change in a magnetic field, opening and closing of a valve in an internal combustion engine for controlling inflow and outflow of vapor, the valve drive unit comprising:
   a first magnetic path component having a flux generating unit that generates a magnetic flux with an electromagnetic coil and a magnetic field forming unit that forms a magnetic field by distribution of the magnetic flux;
   a movable unit made of magnetic material and placed in the magnetic field;
   a second magnetic path component arranged along a direction of movement of said movable unit, wherein said second magnetic path component distributes the magnetic flux;
   a magnetic path forming unit in which the magnetic flux is distributed and forming a magnetic path which persists in said second magnetic path component and passes through said movable unit; and
   a magnetic flux detecting unit provided in said second magnetic path component and detecting the magnetic flux distributed in said second magnetic path component.

2. The electromagnetic actuator of claim 1, and further comprising a drive power control unit that controls drive power supplied to said electromagnetic coil based on a detection signal from said magnetic flux detecting unit.

3. The electromagnetic actuator of claim 1, wherein said magnetic flux detecting unit includes:
   at least two magnetic flux detecting units arranged along the direction of movement of said movable unit; and
   an electric potential difference detecting unit that detects the difference of potential voltage signals generated by said magnetic flux detecting units.

4. An electromagnetic actuator that drives a movable unit using a change in magnetic field, the electromagnetic actuator comprising:
   a first magnetic path component having a flux generating unit that generates a magnetic flux with an electromagnetic coil and a magnetic field forming unit that forms a magnetic field by distribution of the magnetic flux;
   a movable unit made of magnetic material and placed in the magnetic field;
   a second magnetic path component arranged along a direction of movement of said movable unit, wherein said second magnetic path component distributes the magnetic flux;
   a magnetic path forming unit in which the magnetic flux is distributed and forming a magnetic path which persists in said second magnetic path component and passes through said movable unit; and
   a magnetic flux detecting unit provided in said second magnetic path component and detecting the magnetic flux distributed in said second magnetic path component.

5. The electromagnetic actuator of claim 4, and further comprising a drive power control unit that controls drive power supplied to said electromagnetic coil based on a detection signal from said magnetic flux detecting unit.

6. The electromagnetic actuator of claim 4, wherein said magnetic flux detecting unit includes:
   at least two magnetic flux detecting units arranged along the direction of movement of said movable unit; and
   an electric potential difference detecting unit that detects the difference of potential voltage signals generated by said magnetic flux detecting units.

7. An electromagnetic actuator for driving a movable unit using a change in magnetic field, the electromagnetic actuator comprising:
   a first magnetic path component comprising a flux generating unit operable to generate magnetic flux with an electromagnetic coil thereof and a magnetic field forming unit operable to form a magnetic field by distribution of the magnetic flux generated by said flux generating unit;
   a movable unit made of magnetic material and located in a position so as to be in the magnetic field when the magnetic field is formed by said magnetic field forming unit, said movable unit having a direction of movement;
   a second magnetic path component arranged to extend along the direction of movement of said movable unit, said second magnetic path component being operable to distribute the magnetic flux;
   wherein said movable unit and said second magnetic path component are structured and arranged to be operable to form a magnetic path which persists in said second magnetic path component and passes through said movable unit when the magnetic field forming unit forms the magnetic field by distribution of the magnetic flux generated by said flux generating unit; and
   a magnetic flux detecting unit that is provided with said second magnetic path component and operable to detect the magnetic flux distributed in said second magnetic path component.

8. The electromagnetic actuator of claim 7, and further comprising a drive power control unit that controls drive power supplied to said electromagnetic coil based on a detection signal from said magnetic flux detecting unit.

9. A valve driving unit that controls, using a change in a magnetic field, opening and closing of a valve in an internal combustion engine for controlling inflow and outflow of vapor, the valve drive unit comprising the electromagnetic actuator of claim 8.

10. The electromagnetic actuator of claim 8, wherein said second magnetic path component comprises a yoke and said magnetic flux detecting unit comprises a pair of electromagnetic coils on said yoke spaced along the direction of movement of said movable unit.

11. The electromagnetic actuator of claim 10, wherein said pair of electromagnetic coils are connected with a position or speed detecting circuit of said drive power control unit.

12. The electromagnetic actuator of claim 7, wherein said magnetic flux detecting unit includes:
   at least two magnetic flux detecting units arranged along the direction of movement of said movable unit; and
   an electric potential difference detecting unit that detects the difference of potential voltage signals generated by said magnetic flux detecting units.

13. A valve driving unit that controls, using a change in a magnetic field, opening and closing of a valve in an internal combustion engine for controlling inflow and outflow of vapor, the valve drive unit comprising the electromagnetic actuator of claim 12.

14. A valve driving unit that controls, using a change in a magnetic field, opening and closing of a valve in an internal combustion engine for controlling inflow and outflow of vapor, the valve drive unit comprising the electromagnetic actuator of claim 7.

15. The electromagnetic actuator of claim 7, wherein said second magnetic path component comprises a yoke and said magnetic flux detecting unit comprises a pair of electromagnetic coils on said yoke spaced along the direction of movement of said movable unit.

* * * * *